V. SANPHY.
HOSE COUPLING.
APPLICATION FILED AUG. 4, 1911.
1,024,285. Patented Apr. 23, 1912.
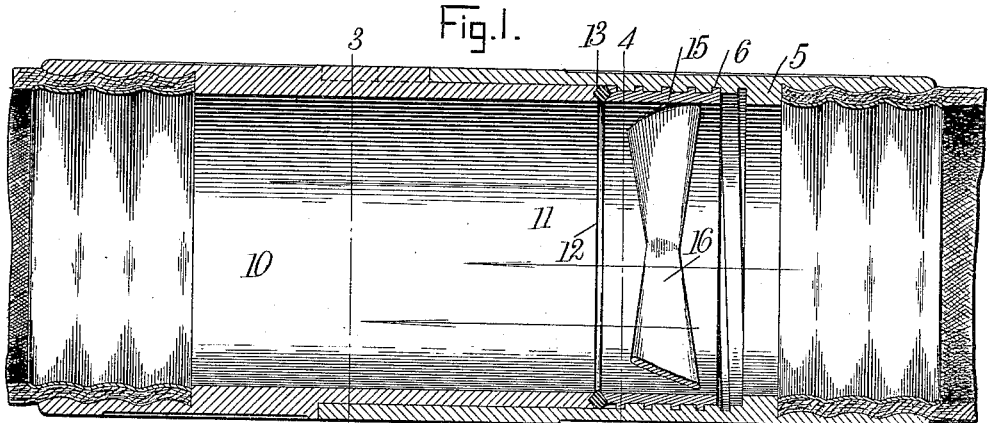
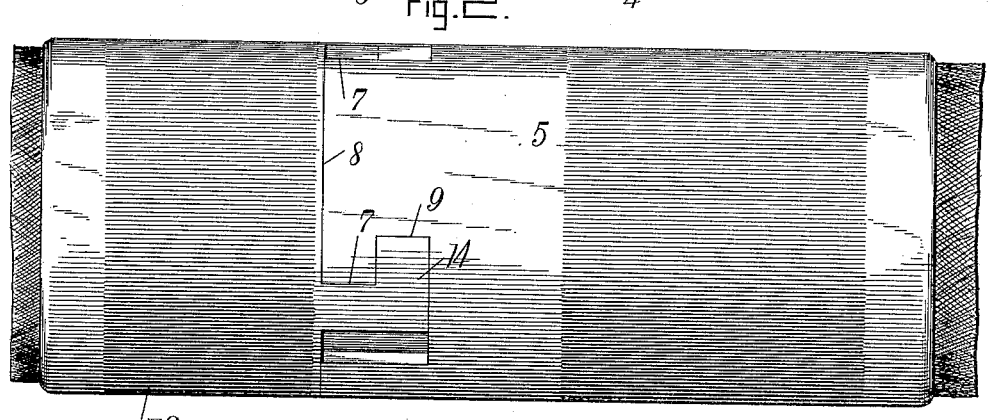
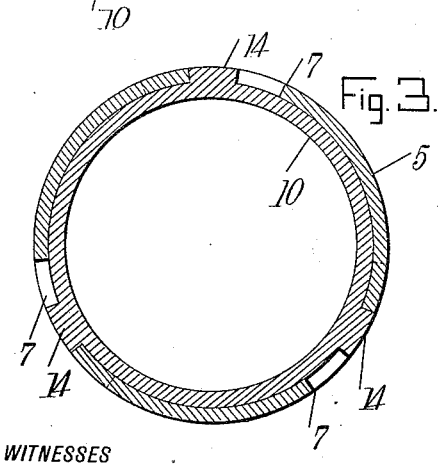
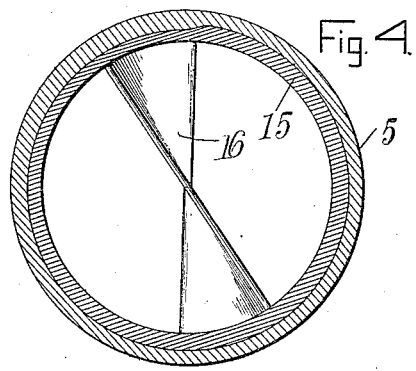
WITNESSES
INVENTOR
Vincent Sanphy
BY
ATTORNEYS

UNITED STATES PATENT OFFICE.

VINCENT SANPHY, OF SOUTH BEND, WASHINGTON.

HOSE-COUPLING.

1,024,285.

Specification of Letters Patent. Patented Apr. 23, 1912.

Application filed August 4, 1911. Serial No. 642,311.

*To all whom it may concern:*

Be it known that I, VINCENT SANPHY, a citizen of the United States, and a resident of South Bend, in the county of Pacific and State of Washington, have invented a new and Improved Hose-Coupling, of which the following is a full, clear, and exact description.

My invention relates to hose couplings, and it has for its object to provide one having a coupling member with an inner thread in which a threaded sleeve meshes, there being a propeller blade in the sleeve, adapted to be operated by the fluid passing through the hose for pushing the sleeve against the shoulder on a companion coupling member.

Additional objects of the invention will appear in the following specification, in which the preferred form of the invention is disclosed.

In the drawings the similar characters of reference indicate corresponding parts in all the views, in which—

Figure 1 is a longitudinal section view of Fig. 2; Fig. 2 is a longitudinal view of the coupling; Fig. 3 is a sectional view on the line 3—3 of Fig. 1; and Fig. 4 is a sectional view on the line 4—4 of Fig. 1.

By referring to the drawings it will be seen that a coupling member 5 is provided having an inner thread 6 and longitudinal openings 7 extending through its end 8, these longitudinal openings 7 being connected with transverse openings 9. A companion coupling member 10 is provided, having a projecting terminal 11 normally disposed within the coupling member 5, this projecting terminal 11 having a shoulder 12 against which is disposed a gasket 13. Projecting outwardly from the coupling member 10, and adjacent to the projecting terminal 11, there are angular members 14, which are adapted to co-act with the openings 7 and 9 in the coupling member 5 to secure the coupling members 10 and 5 together. Meshing in the thread 6 in the coupling member 5, there is a threaded sleeve 15, which is normally disposed against the gasket 13. In this sleeve 15 there is a propeller blade 16, adapted to be engaged by the fluid flowing through the coupling members 5 and 10, to rotate the sleeve 15 in the direction of the gasket 13, against which it normally presses, to prevent any escape of the fluid between the coupling members 5 and 10.

It will be seen that to connect the coupling members 5 and 10 it is merely necessary to introduce the angular members 14 in the longitudinal openings 7 so that when one of the coupling members is rotated slightly relatively to the other, the terminals of the angular members 14 will be disposed in the transverse opening 9 in the coupling member 5 to hold the coupling members in position relatively to each. After this has been done, when the fluid is permitted to flow through the coupling members, the force of the fluid will rotate the sleeve 15 by means of the propeller blade 16 to force the sleeve 15 against the gasket 13, which in turn is pressed against the shoulder 12 of the projecting terminal 11 of the coupling member 10.

Having thus described my invention, I claim as new and desire to secure by Letters Patent:

1. In a coupling a coupling member having a passageway therethrough with a thread in the passageway, a companion coupling member having a shoulder disposed in the first coupling member, a threaded sleeve meshing in the thread in the first coupling member, and a propeller blade secured to the sleeve and adapted to be engaged by a fluid flowing from one coupling member to the other to rotate the sleeve in the direction of the shoulder.

2. In a coupling a coupling member having a passageway with a thread in the passageway, a companion coupling member having a shoulder disposed in the first coupling member, a threaded sleeve meshing in the thread in the first coupling member, a propeller blade secured to the sleeve and adapted to be engaged by a fluid flowing from one coupling member to the other to rotate the sleeve in the direction of the shoulder, there being a longitudinal opening through one end of one of the coupling members which is connected with a transverse opening in the said member, and an annular projecting member on the other member adapted to be introduced in the longitudinal opening so that when one of the coupling members is rotated relatively to the other, the coupling members will be held together while the sleeve will prevent the fluid from escaping through the openings between the coupling members.

In testimony whereof I have signed my name to this specification in the presence of two subscribing witnesses.

VINCENT SANPHY.

Witnesses:
MARTIN C. WELSH,
JOHN T. WELSH.

Copies of this patent may be obtained for five cents each, by addressing the "Commissioner of Patents, Washington, D. C."